United States Patent [19]

Pfost et al.

[11] 4,335,857
[45] Jun. 22, 1982

[54] WEB ALIGNING SYSTEM

[75] Inventors: R. Fred Pfost, Los Altos; William E. Seaman, Woodside; Chester W. Newell, San Jose, all of Calif.

[73] Assignee: Newell Research Corporation, Saratoga, Calif.

[21] Appl. No.: 162,505

[22] Filed: Jun. 24, 1980

[51] Int. Cl.³ .......................... G03B 1/04; G11B 15/32
[52] U.S. Cl. .................................... 242/192; 226/190;
226/194; 226/196; 242/76; 242/199; 242/210
[58] Field of Search ................................ 242/197–204,
242/208–210, 76, 67.3, 192; 226/190, 196, 189,
194; 360/96, 105, 132

[56] References Cited

U.S. PATENT DOCUMENTS

| | | | |
|---|---|---|---|
| 2,553,898 | 5/1951 | Debrie | 226/189 |
| 3,393,849 | 7/1968 | Hass | 226/194 |
| 3,474,981 | 10/1969 | Polder | 242/67.3 |
| 3,491,655 | 1/1970 | Brafford | 226/191 X |
| 3,829,040 | 8/1974 | Nelson | 242/199 |
| 3,974,982 | 8/1976 | Stone | 242/192 |
| 4,084,683 | 4/1978 | Moss | 226/190 X |
| 4,172,569 | 10/1979 | Newell | 242/192 |
| 4,191,345 | 3/1980 | Sato et al. | 242/197 |

Primary Examiner—Leonard D. Christian

[57] ABSTRACT

A web guide system wherein misalignment of take-up and supply rolls relative to a reference surface may be compensated without tape distortion by a crown pulley and an adjacent concave web guide. The concave web guide is a fixed, flangeless post about which the web is partially wrapped. The web tends to be self-centering in the concave curved portion of the guide. Tape is fed from a roll to the concave guide and then to the crown pulley of minimum radius which is mounted for axial as well as rotational motion. Pulley axial motion promotes equal edge tension and completes web self-alignment. Final axial alignment without edge pressure is accomplished by fixed tape edge-guides in the region of the head.

13 Claims, 7 Drawing Figures

WEB ALIGNING SYSTEM

DESCRIPTION

1. Technical Field

The invention relates to web transport systems and in particular to apparatus for guiding webs past a transducer.

2. Background Art

In tape or film (web) drive systems such as magnetic tape and film recorders, the web is usually drawn from a supply roll, over a transducing system, and thence onto a take-up roll. In such systems the lateral registration of the web with respect to the transducer is an important factor in determining the ultimate capability of the reproducing transducer to resolve the data previously stored on the web, both on an instantaneous and long-term basis.

Lateral registration is usually accomplished by web edge guides, whose locations are established by the predetermined dimensional relationships and alignment between the transducer and each of the web rolls. In one typical guide system, fixed flanged posts are interposed in the paths between web rolls and a transducer. The flanges are either spaced apart a dimension equal to or greater than the widest web, in which event the web may wander between the flanges an amount equal to or greater than its width tolerance, or one of the flanges may be spring loaded against one edge so as to urge the other edge against the fixed flange.

A disadvantage of the fixed-post fixed-edge guide system is that the ability of the web to slide or register axially along the post is dependent upon the presence of an adequate air film to ensure web-to-post lubrication. The collapse of the air film from high tension or slow speed may cause web edge damage if the web is delivered into the guide with substantial misalignment. Even with air-film lubrication, the drag on the web will normally be higher than the corresponding drag of a roller, because the bearing surface drag of the roller acts at a reduced radius with respect to the roller surface. The drag will result in energy loss and wear in the guide system and in the tape.

In another typical guide system, fixed posts are used without flanges. Such posts are exemplified in U.S. Pat. No. 4,191,345. U.S. Pat. No. 3,474,981 shows a stationary bar having a straight central section and two opposed end sections that are gradually curved upward so that the edges of the record medium are tensioned slightly greater than the central portion of the record medium. This type of guide tends to keep a web centered during winding. However, the lateral registration is inexact, providing poor "tracking" of the head on the tape between the recording and reproduction processes.

An alternate guide approach is to use rotating cylindrical rollers, rather than fixed guides, in combination with rotating or fixed web edge-guides. One of the disadvantages of a rotating guide system is that once the web is wrapped around the idler, its air-film is lost and no axial movement may occur; therefore the web edge is engaged and registered while it is still unsupported as a plane; the unit pressure on the edge may become high if the web is delivered into the guide with substantial misalignment. This may result in the elastic limit of the web being exceeded, with permanent deformation in the web edge resulting. With either fixed or rotating edge-guides, edge drag may cause long-term and short-term variations in edge velocities with respect to the web centerline, known as static and dynamic skew, respectively. Static skew may be minimized by use of rotating flanges. However, scraping of such a flange against the web edge may cause rapid longitudinal vibrations in the web, known as flutter, and may increase dynamic skew. Flutter causes absolute timing errors in the recovered data; skew causes relative timing errors in data recovered from parallel tracks.

For systems in which tape cassettes are used, the planes of the take-up and supply rolls are sometimes misaligned with respect to a horizontal reference surface, such as cassette walls that support the shaft on which the take-up and supply rolls are mounted. Any slight misalignment of the planes of the tape rolls may cause a substantial misregistration between the tape, the tape guides, and the transducer. In high-speed applications, such as those involved with digital computers and instrumentation type of analog recorders, such misregistrations, even though small, limit the number of tracks and bit-packing densities that may be recorded on the tape. Moreover, even slight misalignments can cause uneven tape tension laterally across the width since the velocity of one tape edge is different from the velocity of the other tape edge. The lateral unevenness in tape tension may cause tape edge wear and perhaps flutter and skew, as mentioned above.

An attempt to minimize the above-described transverse tension and edge force problems is taught by H. E. Hass in U.S. Pat. No. 3,393,849, in which a free-floating crown pulley is employed between two fixed planar edge guides to equalize the transverse tension. In practice, this method suffers from three problems. The first problem is that for web edge force to be reduced to zero, the planes of the edge guides must either be reduced to a single point of contact with the web, or that failing, must at once be parallel with the planes of the tape-rolls and the crown pulley or the tape will be forced to warp as its centerline departs from the tilted roll plane to the idler plane which is normal to the head face.

The second problem is that in recognition of the first problem, the patent shows the guides located in the immediate region of the crown pulley, requiring the pulley to float between them. In order to float, the pulley is shown to be narrower than the tape, leaving the tape overhanging the pulley edges with no edge tension or stiffening support. Such an edge will be readily damaged by the application of edge forces. Further, if in attempting to correct planar misalignment, the pulley seeks a position too far off the centerline of the tape, the tape edge with the largest overhang will be drawn toward the pulley center by the unopposed tape edge tension, developing a transverse force which cannot be overcome by the pulley. The pulley will thus often become "clamped" to one end or the other of its travel.

The third problem is that, to be effective, the crown pulley must generate substantially greater stretch, i.e. tension, at the centerline than at the edges of the web. This will cause the pressure between head and tape to vary greatly from edges to center, causing excessive susceptibility to data dropouts at the edge tracks. A large radius crown will require excessive axial movement, and will be unstable. The problems described are particularly acute in cassette systems where the spans between tape rolls, guides and heads are of necessity very short.

An object of the invention is to provide a web guide system which compensates for substantial misalignments of the planes of the take-up and supply rolls even in short-span tape-drive systems, while maintaining uniform transverse web tension and velocity. Another object is to provide a web guide system which avoids high edge contact pressure, minimizing "coining" and premature edge wear.

DISCLOSURE OF INVENTION

The above objects are achieved by a web guide system having the combination of at least one fixed concave web guide feeding the web to an axially moving convex crown pulley, followed by an edge guide. The concave guide serves two important functions. The first is to stabilize the axial position of an axially floating crown pulley without imposing tape edge restraint in the region of the pulley, thus allowing vertical registration of the web to be accomplished after, and only after, the tape has passed around the pulley, where its centerline can be aligned with the plane normal to the head face without tape distortion and allowing the crown pulley to be wider than the tape, to give it continuous edge-to-edge support. The second is to equalize net transverse tape tension in the web delivered to the head by complementing the loss in edge tensions caused by the crown.

Neither the concave guide, the convex crown pulley, nor the fixed edge guide, working alone, can provide the guiding through the plane changes into proper registration with the head, without tape distortion. However, with the concave guide providing stability and edge tension equalization, the crown pulley will correct for tape roll plane misalignment without edge contact, and the edge guide will thereafter provide vertical registration.

In a preferred embodiment, a concave web guide is positioned in the supply and take-up spans near a convex crown pulley on each side of a transducer. In another embodiment a convex web guide and a concave crown pulley is used. This enables misalignment compensation from either web roll, since either can be the supply or take-up roll in many tape systems.

BEST MODE FOR CARRYING OUT THE INVENTION

Figure 1:
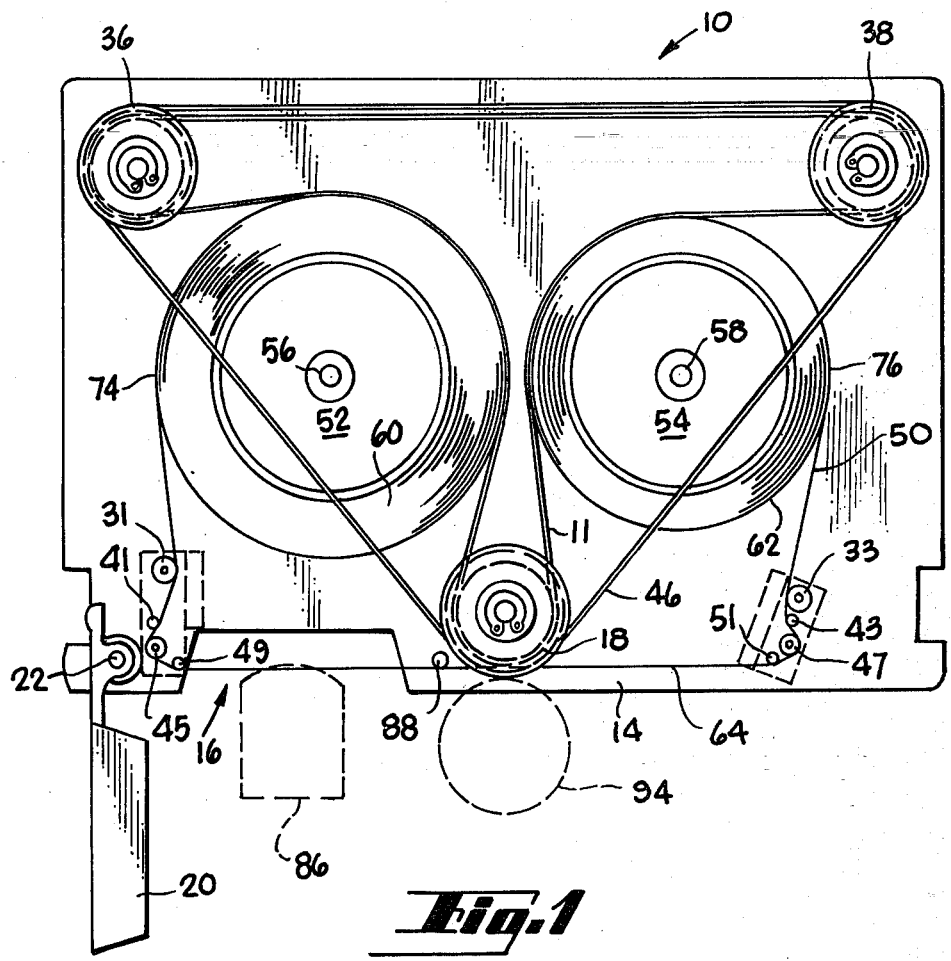
FIG. 1 is a top view of a tape cassette having a web path guided by the web guide system of the present invention.

Referring now to the drawings, FIG. 1 shows a sample tape cassette configuration especially suited for electronic data processing applications using magnetic tape. The invention is not restricted to magnetic tape, but is applicable to other webs being wound and unwound. Similarly, the invention is described relative to tape cassettes, but the invention is applicable to other containers as well, or even to open reels mounted on supports.

A suitable cassette for use in this invention is described in prior U.S. Pat. No. 4,172,569, assigned to the assignee of this invention. A short description of this cassette follows. While this cassette is preferable because of high tape speeds which can be attained, cassettes, cartridges and other containers with other constructions may be used.

A cassette 10 includes a wall 14 with a head aperture or port 16, a rotary drive and belt guide member 18, and a tape guard 20, which is mounted for rotation about a pin 22 fixed to wall 14 in order to render the cartridge compatible with existing commercially available equipment.

First and second hubs 52, 54 act as tape supply and take-up hubs and are rotatably mounted with parallel axes of rotation and in a generally coplanar relationship on the lower wall 14 by means of a pair of axial shafts 56, 58. A length of magnetic tape 50 having a nominally 0.001 inch backing thickness, or thinner, the backing typically made of Mylar, is distributed within the cassette 10, having one end portion or roll 60 wound on the first hub 52, an opposite end portion or roll 62 wound on the second hub 54, and an intermediate portion 64 extending between the hubs from a peripheral point 74 on tape roll 60 to a peripheral point 76 on tape roll 62. In operation the tape 50 passes between the rolls 60, 62 in a path parallel to the wall 14. The tape backing has a coating of magnetic material completely across the width of the tape, the width being typically 0.25 inch.

The intermediate portion 64 of the tape is trained over a pair of fixed tape cleaning guides 31, 33. The tape cleaning guides have an edge for removing oxide particles from the tape. Another pair of fixed guides 35, 37 may be provided for balancing tape tension. The fixed concave guides 41, 43 are positioned adjacent to the crown pulleys 45, 47, respectively. The concave guides and the crown pulley are described more fully below.

Two other fixed guides 49, 51 provide proper alignment of the tape 50 with the aperture 16 in order to maintain a proper operational relationship with a magnetic recording head which may be part of a tape drive, not shown, approaching the tape at the magnetic head position 86 when in operative placement with the tape drive. A tape support pin 88 fixed to the lower wall 14 prevents the tape 50 from touching the drive and belt guide member 18 while the head is in operational contact with recording tape 50.

The drive member 18 is rotatably mounted on a shaft to the wall 14 at a centered frontal position on the cassette 10 so as to come into contact with a drive capstan 94 when the cassette 10 is in operative placement in a record/playback apparatus, not shown.

The pair of similar rotary belt guide members, or idlers, 36, 38 are rotatably mounted on a pair of parallel shafts fixed to the lower wall 14. The idlers 36, 38, drive member 18 are all disposed on axes parallel to the axes of the hubs 52, 54 and are vertically aligned. A tensioning belt 46 is trained about the rotary drive member 18 and idlers 36, 38. Drive member 18 is engaged by capstan 94 for rotary motion.

An endless loop drive belt 11 of the present invention having a fixed length is trained about the drive member 18 and the idlers 36, 38. The tensioning belt 46 is at a higher elevation than the drive belt 11 so as to clear the tape rolls.

The tape rolls 60 and 62 have planes defined by an extension of the tape center line radially outwardly from the rolls. By mounting the axial shafts 56 and 58 perpendicular to wall 14 and by placing the tape rolls at the same elevation, the planes defined by the outwardly extended center lines should be parallel to the reference wall 14. However, in assembling tape cartridges, the axial shafts 56 and 58 may be slightly misaligned such that the planes defined by the center-lines of the tape rolls are not coplanar, nor are they normal to the engaging face of the head 86. This creates the misalignment problem previously described. If the misalignment is not corrected, the tape will be vertically tilted with respect to the head. Such tilt implies that one edge of the tape delivered from such tilted roll is travelling at a greater velocity than the opposite edge of the tape. This causes transverse tension within the tape, as previously described.

The problem described above may be partially corrected by warping the tape, such as by passage over a crown pulley. However, a crown pulley does not provide adequate axial registration of the tape with respect to the head, and even a crown pulley which axially floats, combined with fixed tape edge guides, as described in U.S. Pat. No. 3,393,894 will not be adequate to correct substantial misalignment. This is because the guides must surround the idler and the tape can drive the floating roller to an extreme position and then suffer edge damage in a crash against a wall or other surface.

In the present invention, we have discovered that the combination of a fixed concave guide in combination with a crown pulley followed by a single edge guide removed from the pulley region, will stabilize the crown pulley and allow proper compensation for tape roll plane misalignment and edge registration, each in independent and optimum fashion.

Figure 2A:
FIG. 2a is a top view of the guide of FIG. 2.
Figures 2, 3:
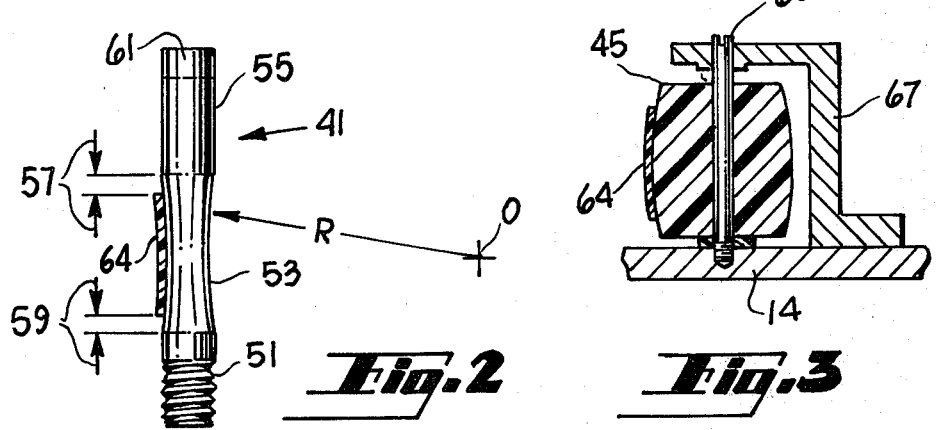
FIG. 2 is a side view of a concave fixed web guide of the present invention.
FIG. 3 is a side view of a crown pulley of the present invention.

The tape guides 41 and 43 are identical and are illustrated and explained with reference to FIG. 2. In FIG. 2, the tape guide 41 is shown to be a generally upright cylinder having a lower threaded portion 51, a central concave portion 53 and an upper portion 55.

The threaded portion 51 extends into the lower wall of the cassette which may be by way of example approximately 0.1 inch in extent. The position of the concave guide 41 may be vertically adjusted by means of the amount the threaded portion 51 extends into a mating bore within wall 14. The overall length of the tape guide from one end to the other is 0.583 inch, and its major diameter is 0.125 inch. The central concave portion 53 is gently curved and has a dimension greater than the width of the tape which it guides. For example, tape section 64 is shown to be wrapped around the guide and centered within the concave portion. The arrows 57 and 59 indicate a dimension on either side of the tape which allows the tape to "walk" on the guide. The dimension indicated by the arrows 57 and 59 is approximately 0.025 inch, although a slightly greater dimension could be provided.

The web contact portion of the guide exceeds the width of the web in the range of 0.010 to 0.100 inches on each side of 0.25 inch webs and proportionate thereto for other web widths. The maximum depression of the guide is in the range 0.005 to 0.050 inches for 0.25 inch webs and proportionate thereto for other web widths. The preferred concave surface is one having a circular arc of radius R extending from an origin O. Radius R has an extent of 0.437 inch. Although a circular concave arc is preferred, other symmetric concave shapes can be used. The function of the concave shape is to cause tape warping and to complement the crown pulley effect. Such warping allows the edge tension from planar misalignment of the tape to be corrected by creating forces across the width of the tape wherein the tape is urged to a new lateral position.

The upper portion 55 of the tape guide has an extent so that the tape will not touch yoke 67. As a matter of convenience, the upper end 61 of section 55 is adapted with a groove so that a screw driver can advance the guide into a mating bore. In the top view of FIG. 2a the groove 63 in the guide 41 may be seen. Alignment of the guide with the head face can be accomplished by supporting end 55 in a hole in yoke 67.

The concave guide 41 is positioned so that tape will be wrapped around the guide sufficiently so that the tape is warped. The desired angle of wrap depends upon tape width, idler crown radius and wrap angle. The tape should maintain contact with the guide and crown pulley at all times without wrinkling, and the curvature of the guide and crown or their angles of wrap may be adjusted within that limit in order that the tape be subjected to a sufficient extent of corrective force. The extent of corrective force would depend upon the amount of expected tape roll misalignment, the tape thickness and its tension. In the above example, a 19° tape wrap around the concave guide will effectively complement the edge-to-edge tension variation caused by a 90° tape wrap around a crown pulley with radius of curvature of 2", without wrinkling the tape. This will correct a full-roll edge-to-edge tilt of at least ±0.025" while maintaining the crown pulley within its axial range. Tape which is misaligned in the concave section will experience a greater path length at an edge which is furthest from the center of the curved section. The same misalignment without the concave guide will cause that same tape edge to go a shorter distance to reach the head. Thus, as tape slides over the concave tape guide, the two edges tend to travel the same distance, leaving only "fine" correction to the crown pulley of FIG. 3. With reference to FIG. 3, the pulley 45 is shown, which is identical to pulley 47 in FIG. 1. The function of the pulley is to change the tape direction in an angle approximately equal to 90°, as well as assisting in providing tape alignment by making a final adjustment in the tape-edge path lengths. Pulley 45 is made of a non-resilient material, such as a hard plastic and has a central bore allowing the axial shaft 65 retained in yoke 67 to pass therethrough, or may be mounted on a live shaft which rotates in bearings in the yoke. Pulley 45 is free to move axially as well as to rotate freely. The crown pulley 45 has a convex shaped outer surface over which tape 64 will tend to be centered over the highest point of the roller. In the preferred embodiment, the contour of the arc may complement the radius of the arc of the concave guide of FIG. 2, but is not limited to this curvature. Since the crown pulley 45 can move axially, the pulley can chase a web which is out of alignment, as the web delivered from the roll moves transversely. However, crown pulley 45 will tend to be stabilized at a central position on shaft 65 by the concave tape guide 41.

Yoke 67 is mounted to wall 14 adjacent to the concave tape guide 41. The concave warping of the tape provided by the fixed guide 41 is immediately countered by convex warping provided by the crown pulley 45. In each instance the tape center line will be adjusted relative to the extended center line of the tape rolls, but neither the concave tape guide, nor the crown pulley, by itself, will provide adequate or stable correction. However, when both work together, a new result is achieved and tape is shifted exactly to a desired elevation without distortion or substantial edge pressure. Once at a desired elevation, fixed guides, with flanges, such as guides 49 and 51 feed the tape in a tape span which faces a transducer at the head position 86.

While the convex crown pulley of this patent application has been shown to have an arc shape, it will be appreciated that trapezoidal crowns could also be used. In the event that a convex crown pulley is used, then the concave fixed guide should also be trapezoidal, with a trapezoidal shape which complements the trapezoidal shape of the convex pulley.

Figure 4:
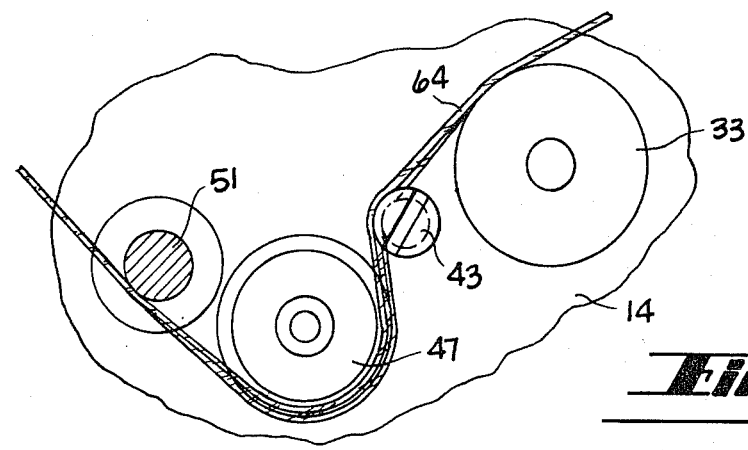
FIG. 4 is a top view of the web guide system of the present invention, shown in a greatly enlarged detail view.

With reference to FIG. 4, a tape span 64 is shown to be partially wrapped about tape cleaning guide 33 which guides tape toward the fixed guide 43. Tape 64 is partially wrapped about this guide and is then directed to the crown pulley 47 where the direction of the tape is substantially changed. Lastly, the tape passes between the flanges of the fixed guide 51 where the tape is provided with a proper vertical alignment with respect to a magnetic head.

Each of the guides, as well as the crown pulley, is mounted with a parallel axis perpendicular to base 14. In cassette systems, opposed ends of the guide and pulley may be mounted in opposite cassette walls. Alternatively, the yoke 67 may be used to provide support for a free end of each of the guides and the pulley shaft.

Figure 5:
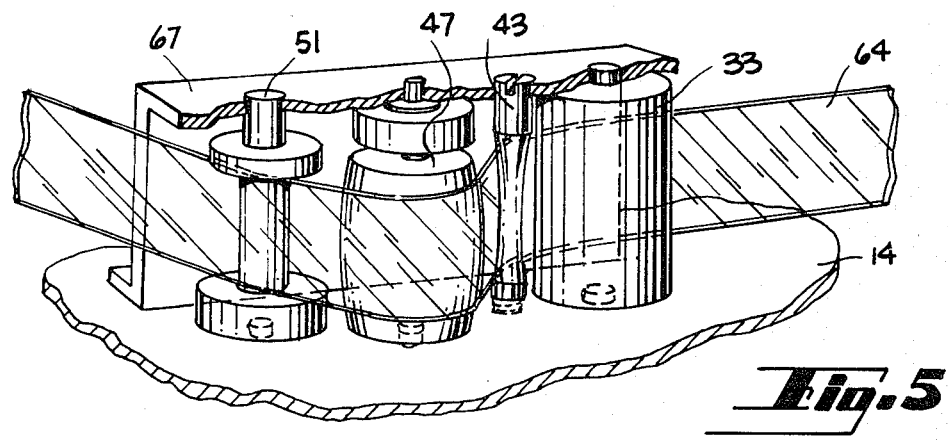
FIG. 5 is a perspective view of a preferred embodiment of the web guide detail illustrated in FIG. 4.

With reference to FIG. 5, tape 64 is shown passing through a preferred embodiment of the web guide system of the present invention. The tape cleaning guide 33 is optional and is used not only to clean tape, but to feed tape at a desired angle to the fixed concave guide 43. From there the tape passes to the crown member 47 which floats axially above base 14. From there, tape is guided to the fixed flange edge guide 51, as previously described.

Figure 6:
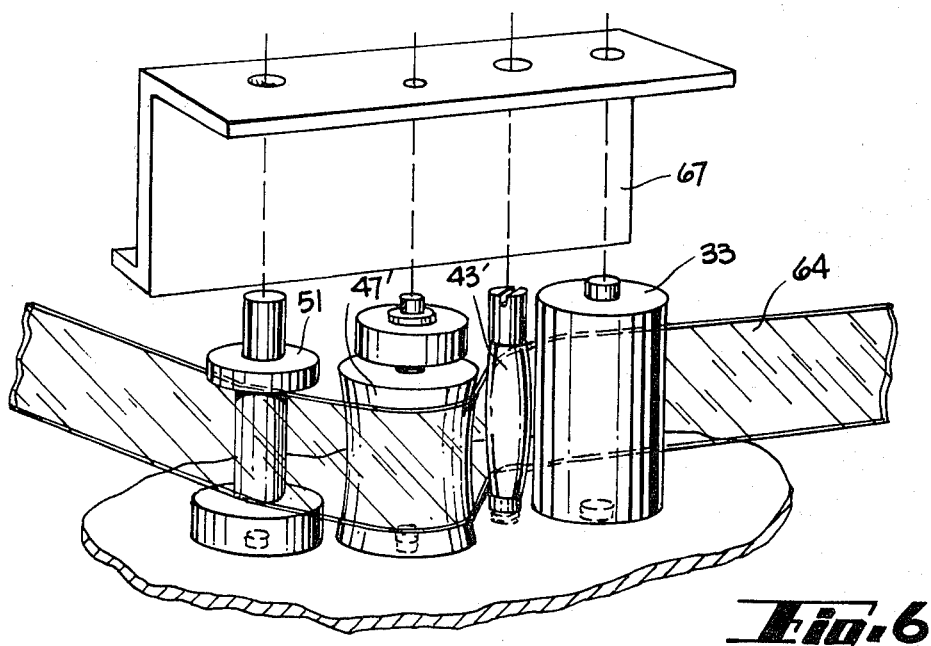
FIG. 6 is a perspective view of another embodiment of the web guide system illustrated in FIG. 4.

In most tape cassettes, two tape guiding systems of the type illustrated in FIG. 5 or 6 would be used, one on either side of the head. However, in other web devices, it may be desirable to guide a web only in one direction. In such an instance, only one web guiding system of the present invention would be used.

FIG. 6 is similar to FIG. 5, except that the concave-convex relationship between the fixed guide 43 and the crown member 47 of FIG. 5 is interchanged. In FIG. 6, the fixed web guide 43' is convex and feeds tape 64 to a concave crown member 47'. The stabilization between the crown member 47' and the fixed guide 43' is essentially the same as previously described. It should be noted that the flanged edge guide 51 provides transverse registration of the web with respect to a transducer, such as magnetic head 86 of FIG. 1. In other words, the flanged edge guide 51 sets the elevation of the tape with respect to a transducer. While a fixed guide is shown to be to the right of the crown member in FIGS. 5 and 6, it could also be on the left side. The fixed guide may precede the crown member, or vice-versa.

In this patent application, the crown member 47 has been described as a pulley. It will be realized by those skilled in the art that axial motion of member 47 is the principal component of its motion, not rotary motion. Therefore, if rotary motion is prevented, such as by keying member 47 so that it may slide axially, but not rotate, the crown member is still within the spirit and scope of the present invention. Crown member 47 may be convex or concave as selected. The curvature of the crown must complement the curvature of the web guide.

We have found it practical to guide webs as thin as 0.0002 inches in the cartridge described at speeds as high as 240 ips in such a guide system, with edge track bit-packing densities as high as 6400 bpi without error after over 100,000 passes.

While this invention has been described with reference to a tape cartridge, it is applicable to other web guiding systems where close web alignment is needed.

We claim:

1. A web guide system comprising,
    a horizontal reference surface over which a web path is defined between a transducer and a web source having a fixed width web with opposite edges,
    a first web guide member between the transducer and the source, the guide partially defining said web path by said web being partially wrapped about said guide, the guide having an upright axis relative to the reference surface and having a web contact surface exceeding the width of the web and having a symmetrical arcuate profile, shallow enough so that web contact is maintained across the surface when the web travels past the guide but great enough to exert axial self-alignment forces on the part of the web in contact with said web contact surface of the guide, without edge guide contact with the web,
    a crown member with a symmetrical arcuate profile positioned between the transducer and the source, spaced from the first web guide member, the member partially defining the web path proximate to said web guide by said web being partially wrapped about said member, said member having a width at least equal to the web and having an upright axis generally parallel to the web guide, said member adapted for axial motion, one of the profiles of the web guide and crown member being concave, the other convex whereby said proximate first web guide urges a moving web toward said crown member in such a manner as to tend to position said member toward the center of its range of axial movement, thus stabilizing the axial motion of the member, without edge guide contact with the web, and whereby said crown member seeks an axial position such that the path lengths of the web edges from transducer to the source are substantially equal, and
    a flanged edge guide partially defining the web path between said transducer and said crown member or said web guide whereby said flanged edge guide registers said web transversely with respect to said transducer.

2. The web guide system of claim 1 wherein said crown member has a crown of radius small enough so that web contact is just maintained across its width.

3. The web guide system of claim 1 wherein the wrap angle and profile of the web guide substantially complements the effect of the curvature and wrap angle of the crown member upon transverse tension across the width of the web.

4. The web guide system of claim 3 wherein the said complementing effect of the wrap angle and profile of the concave web guide is substantially complete at the edges and the center-line of the web.

5. The web guide system of claim 1 wherein said crown member has a width greater than the tape by an amount at least equal to its range of axial motion.

6. The web guide system of claim 1 wherein said concave web guide precedes said crown member.

7. The web guide system of claim 1 wherein said crown member precedes said concave web guide.

8. The web guide system of claim 1 wherein said web contact portion of the web guide exceeds the width of the web in the range of 0.010 to 0.100 inches on each side of the tape.

9. The web guide system of claim 1 wherein said maximum depression of said profile of the concave web guide is in the range of 0.005 to 0.050 inches for 0.25 inch webs, and proportionate thereto for other web widths.

10. The web guide system of claim 1 wherein said crown member exceeds the width of the web in the range of 0.010 to 0.100 inches for 0.25 inch webs, and proportionate thereto for other web widths.

11. The web guide system of claim 1 wherein said crown member is a crown pulley.

12. The web guide system of claim 1 wherein said crown member has a convex profile and said web guide has a concave profile.

13. In a cartridge of the type having a transducer, web source and take-up rolls mounted on a reference surface and a web path defined between the rolls and past the transducer, including a flanged edge guide for web registration with respect to the transducer, the improvement comprising:

a fixed web guide member between the transducer and the source, the guide partially defining said web path by said web being partially wrapped about said guide, the guide having an upright axis relative to the reference surface and having a web contact surface exceeding the width of the web and having a symmetrical arcuate profile, shallow enough so that web contact is maintained across the surface when the web travels past the guide but great enough to exert vertical self-alignment forces on the part of the web in contact with said web contact surface of the guide, without edge guide contact with the web, a crown member with a symmetrical arcuate profile positioned between the transducer and the source, spaced from the first web guide member, the member partially defining the web path proximate to said web guide by said web being partially wrapped about said member, said member having a width at least equal to the web and having an upright axis generally parallel to the web guide, said member adapted for axial motion, one of the profiles of the web guide and crown member being concave, the other convex whereby said proximate first web guide urges a moving web toward said crown member in such a manner as to tend to position said member toward the center of its range of axial movement, thus stabilizing the axial motion of the member, without edge guide contact with the web and whereby said crown member seeks an axial position such that the path lengths of the web edges from transducer to the source are substantially equal.

* * * * *